(12) United States Patent
Hosoda et al.

(10) Patent No.: US 7,616,868 B2
(45) Date of Patent: Nov. 10, 2009

(54) VIDEO PROCESSING DEVICE

(75) Inventors: Tatsuya Hosoda, Nagano-ken (JP);
Junichiro Shinozaki, Nagano-ken (JP);
Fumiaki Mukaiyama, Nagano-ken (JP);
Seiji Aiso, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 552 days.

(21) Appl. No.: 11/081,135

(22) Filed: Mar. 15, 2005

(65) Prior Publication Data
US 2005/0232606 A1    Oct. 20, 2005

(30) Foreign Application Priority Data
Mar. 24, 2004    (JP)    ............... 2004-087408

(51) Int. Cl.
*H04N 7/26*    (2006.01)
*H04N 5/91*    (2006.01)

(52) U.S. Cl. .......................... 386/124; 386/46

(58) Field of Classification Search .................. 386/46
See application file for complete search history.

(56) References Cited

U.S. PATENT DOCUMENTS

| 6,704,029 | B1 * | 3/2004 | Ikeda et al. | ............. 715/723 |
| 2004/0012623 | A1 * | 1/2004 | Yashiro et al. | ............. 345/723 |
| 2004/0088723 | A1 * | 5/2004 | Ma et al. | ............. 725/19 |

FOREIGN PATENT DOCUMENTS

JP    2002-142189    5/2002

OTHER PUBLICATIONS

Abstract of Japanese Patent Publication No. 2002-142189, Pub. Date: May 17, 2002, Patent Abstracts of Japan.

* cited by examiner

*Primary Examiner*—Marsha D. Banks-Harold
*Assistant Examiner*—Oluwaseun A Adegeye
(74) *Attorney, Agent, or Firm*—Martine Penilla & Gencarella, LLP

(57) ABSTRACT

The video processing device plays the video on an interface screen 250, and receives from a Digest button 203 designation of frame image data chosen by the user for use in digest video. The video processing device, on the basis of frame evaluation levels, displays Best-frame indicators 209 and Division indicators 210 serving as reference indicators when the user designates frame image.

14 Claims, 13 Drawing Sheets

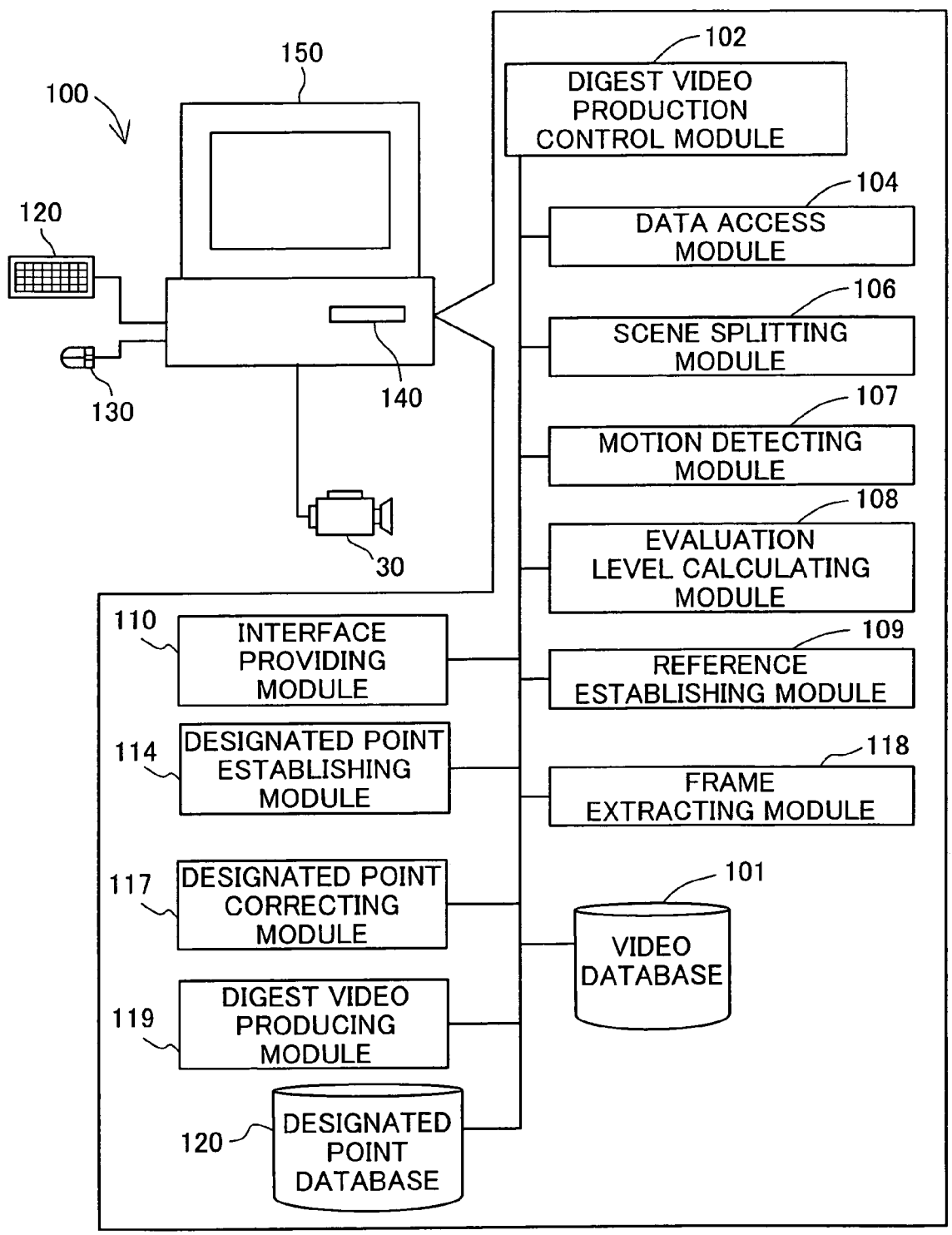

Fig.4(a) Zoom in
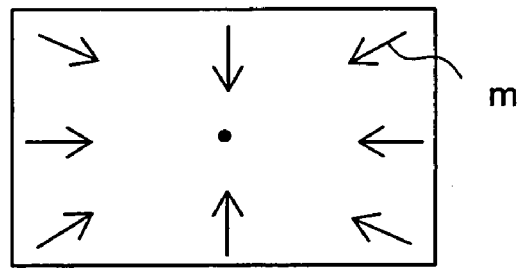
Fig.4(b) Zoom out
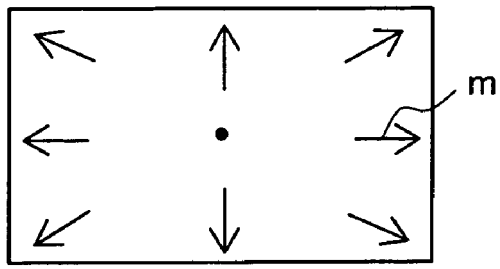
Fig.4(c) Pan
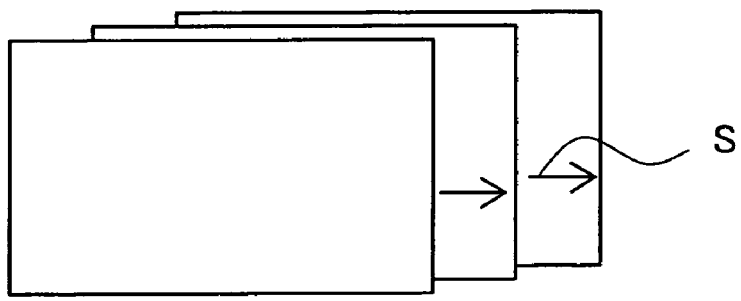
Fig.5
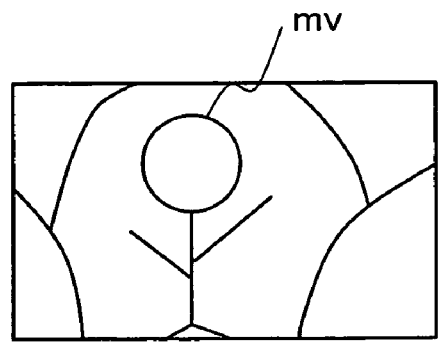

VIDEO PROCESSING DEVICE

CROSS-REFERENCE TO RELATED APPLICATIONS

The present application claims the priority based on Japanese Patent Application No. 2004-87408 filed on Mar. 24, 2004, the disclosure of which is hereby incorporated by reference in its entirety.

BACKGROUND OF THE INVENTION

1. Field of the Invention

The invention relates to a video processing device for producing digest video data, the content of which has been condensed from video data.

2. Description of the Related Art

Recently, with the growing popularity of video cameras, it has become increasingly more common to take photographs using video cameras. At the same time, there has been greater demand for quickly and easily acquiring content from wide-ranging video data that has been photographed over a long period of time. Techniques have thus been proposed to create digest video data by way of information condensed from video data.

In JP2002-142189A, for example, there is proposed a technology for creating digest video data automatically. According to this prior art, video data is divided into a plurality of scenes, a pre-selected type of evaluation level is calculated for each scene, and digest video data is produced using a predetermined number of scenes from among those with high evaluation levels.

On the other hand, there are also instances in which a user may desire to produce digest video data himself. Thus, there exist applications for assisting the user to create digest video data while actually viewing the video. Such applications are provided with a video playback function, a fast-forward function, and the like, so that the user, while playing back or fast-forwarding, can designate points that he wants to use in the digest video data, to produce the digest video data.

Since digest video data produced automatically does not always reflect the user's choice, applications like those described above are tentatively useful. However, the process of playing back and fast-forwarding while searching for the scenes that one wants to use in digest video data is laborious and time consuming.

SUMMARY OF THE INVENTION

An object of the present invention to provide a video processing device that assists the user to easily produce digest video data.

According to an aspect of the present invention, there is provided a device for producing digest video data from original video data including a plurality of frame images that are continuous in a time series. The device comprises: a frame evaluation level calculating module configured to calculate a frame evaluation level representing an importance of each frame image; an interface providing module configured to provide an interface screen for allowing a user to designate a user-selected frame image, which is desired to be used in the digest video data; a reference indicator establishing module configured to establish, based on the frame evaluation levels of the frame images, reference indicator information representing an indicator display format of a reference indicator, which is to be presented on the interface screen to assist the user in specifying the user-selected frame image; a designation input module configured to input designating information that designates the user-selected frame image; and a digest video producing module configured to produce the digest video data including at least a portion of designated frame data which represent a series of frame images including the user-selected frame image. The interface screen includes: a playback display area for playback of video based on the video data; a playback position indication area for graphically indicating a playback position of the video data; and a reference indicator display area for displaying the reference indicator according to the reference indicator information.

According to the above aspect of the present invention, the user can refer to a displayed reference indicator to easily select frame image. Reference indicator information may consist, for example, of information relating to display location of the reference indicator, and include information relating to type (character or symbol), display format, and display color for the reference indicator.

The graphic indicator which indicates the playback position may consist, for example, of a time axis on which playback position is indicated by a slide bar, or a display like an analog watch on which playback position is indicated by the long hand and the short hand. In preferred practice, the graphic indicator will be of a format enabling visual confirmation of temporal placement of the position currently being played back, within the total playback time of the video data.

The indicator display area may be positioned at any location. For example, the indicator display area may be superposed over the playback position display area, with the reference indicator displayed on the graphic display as a symbol (e.g. a triangle or a circle), a character, or predetermined color. By so doing, it becomes easy for the user to visually ascertain the relationship between reference indicator and playback position, making it easier to select frame image data for use in digest video data.

The reference indicator may be displayed using a symbol (e.g. a triangle or a circle) or a character, or displayed by changing the color of the graphic display at the playback position. The reference indicator may also consist of a frame evaluation level shown in the form of character. In this case, reference indicator information may consist of the value to be displayed and the display location of the reference indicator.

The display location of the reference indicator may be a location corresponding to the frame image having the highest frame evaluation level in the video data or otherwise established on the basis of frame evaluation level; or established at intervals of a predetermined number of frame images. When video data has been divided into scenes that include a plurality of frame images, reference indicators may be displayed at breaks between the scenes.

The frame evaluation level calculating module may calculate the evaluation level concerning zoom operation or pan operation of the video camera, for example. Zoom operation refers to enlarging or reducing the image of a subject using a zoom lens. Pan operation refers to changing the orientation of the camera over a wide field, with the camera at a fixed position.

The interface screen may additionally include an evaluation criteria selection area enabling the user to select a criteria for calculating the frame evaluation level, such as "location of body in motion" or "size of body in motion." This is effective in cases such as where the reference indicator is displayed at a location corresponding to a frame image with the highest frame evaluation level. In this case the user, by selecting the criteria for calculating the frame evaluation level, can display the reference indicator based on a evaluation criteria according to his preference.

The reference indicator may be a graph, symbol, or character providing visual representation of the frame evaluation level.

The frame evaluation level may be displayed in a graph, such as a line chart or bar graph, indicating a frame evaluation level for each frame image; or as a change in shading or hue. By referring to these displays, the user can easily select frame images to be used in the digest video data.

The designated frame data may constitute a frame group which is a set of at least a predetermined number of frame images in a continuous time series, including the user-selected frame image.

By so doing, the user, by means of selecting a frame image, is able to easily select a frame group that ensures length sufficient for the viewer of the digest video data to ascertain the content thereof.

Extraction of a frame group may be carried out by various methods. For example, the user-selected frame image and a predetermined number of frame images preceding and following the user-selected frame image may be assembled into a frame group. Also, frame images preceding and following the user-selected frame image may be extracted in predetermined number on the basis of frame evaluation level.

A single frame group may be extracted for a single user-selected frame image, or multiple frame groups may be extracted for a single user-selected frame image. Where a plurality of user-selected frame images exist, the digest video producing module may produce digest video data by joining together a plurality of frame groups. The digest video producing module may comprise a function for prompting the user to select a playback order for a plurality of frame groups, and producing the digest video data in accordance with the user-selected playback order.

The designation information may designate the foremost and endmost frame images in a frame group.

By so doing, the number of frame images in a frame group can be made to reflect the intention of the user.

The interface providing module of the video processing device may start playback of the video from a frame image designated by the user as the playback start position.

According to the above aspect of the present invention, playback from any position is easy. As the interface for designating the playback start position, there could be employed, for example, one in which the user moves a slide bar on a time axis indicating the playback position of the video. Also, the user may specify an amount of fast-forward or rewind of a video image in terms of time or a number of frame images.

Further, the playback start position may be designated by means of selecting from a frame image associated with the aforementioned reference indicator information, and the designated frame data.

By so doing, it is possible to perform playback skipping to the aforementioned frame image. The interface for making the aforementioned selection may be a button which, each time it is pressed, sequentially selects an aforementioned frame image in the time series.

The interface providing module may provide an interface for specifying an aforementioned playback start position, adjacent to the aforementioned selection input area.

In many instances, when producing digest video data, the user will carry out, in consecutive fashion, input of designation information followed by designation of a playback start position which is equivalent to fast forwarding of the video, etc. Thus, according to the above aspect of the present invention, ease of operation when creating video is improved.

The playback display area, in response to input of the aforementioned designation information, may skip to the frame image associated with the reference indicator information and begin playback of the video.

By so doing, once designation information is input, playback takes place by automatically skipping to the frame image associated with the reference indicator information, so that the user is spared the inconvenience of having to fast forward or rewind the video.

The video processing device may further comprise: a correction input module for input of correction information for the purpose of correcting the designation information; and a correcting module for correcting the designated frame data on the basis of the correction information.

By means of this arrangement, the user can modify the user-selected frame images after they have been initially selected. Correction information may consist, for example, of information to exclude any user-selected frame image from the selection, that is, to delete any designation information. In this case, the correcting module may delete the user-selected frame image corresponding to the designation information.

In the aforementioned video processing device, the playback position display area may have a designated clip display for displaying, in a manner distinguishable from other frame images, the playback position corresponding to the designated frame image.

With this arrangement, the user can visually ascertain the playback position of frame image used in the digest video data.

The video processing device may further comprise a location input module for input of a change in location of the designated clip; and a correcting module for correcting the designated frame data on the basis of the change.

With this arrangement, the user can correct the designated frame data with visual confirmation.

The video processing device may further comprise: a desired playback time acquiring module for acquiring a desired playback time of the digest video data; and an adjusting module for adjusting the length of designated frame data on the basis of the desired playback time.

According to the present invention, digest video data can be produced according to a desired playback time.

The present invention, in addition to the aspect of a video processing device, may also take the aspect of a video processing method. Various other modes, such as a computer program for realizing same and a recording medium having such a program recorded thereon, are possible as well. The various supplementary elements indicated previously would be applicable to each of these modes as well.

Where the invention takes the form of a computer program or recording medium having the program recorded thereon, it may have an arrangement of an entire program for controlling operation of the video processing device, or an arrangement for performing only the functions of the invention. Exemplary recording media include a flexible disk, CD-ROM, DVD-ROM, magnetooptical disk, IC card, ROM cartridge, a computer internal memory device (RAM, ROM or other memory), and an external memory device.

These and other objects, features, aspects, and advantages of the present invention will become more apparent from the following detailed description of the preferred embodiments with the accompanying drawings.

BRIEF DESCRIPTION OF THE DRAWINGS

FIG. 2 illustrates the arrangement of the video processing device as a embodiment.

FIGS. 4(a) through 4(c) illustrate a method for detecting the start and end of zoom operation, and the start and end of pan operation.

FIG. 5 illustrates a moving object mv.

DESCRIPTION OF THE PREFERRED EMBODIMENT

The embodiments of the invention are described according to the following section headings.

Figure 1:
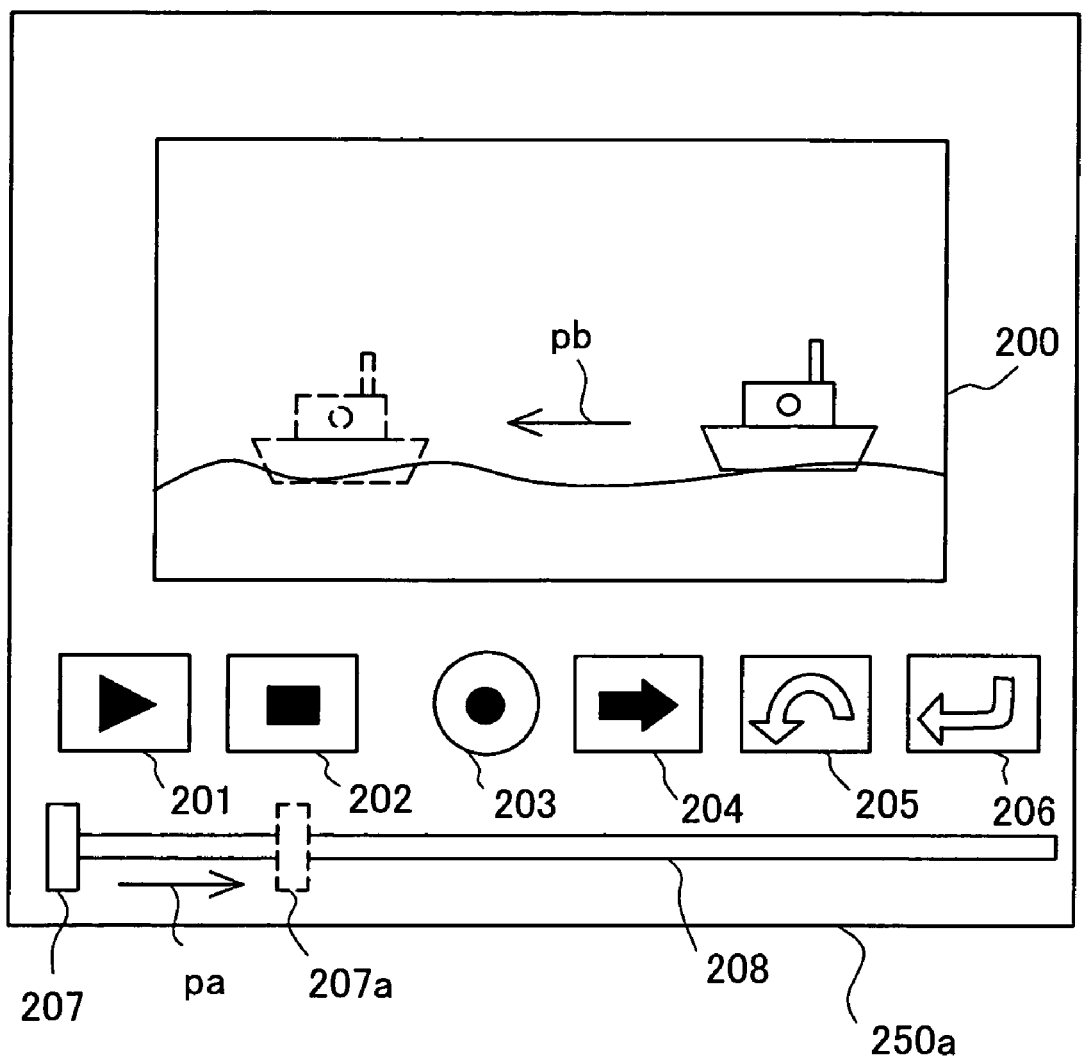
FIG. 1 illustrates the interface screen of the video processing device as a embodiment.

A. Embodiment:
   A1. Arrangement of Interface Screen:
   A2. Arrangement of Video Processing Device:
   A3. Calculation of Frame Evaluation Levels:
   A4. Reference Indicator and Button Functions:
   A5. Processing Flow:

B. Modifications:

A. Embodiment:

A1. Arrangement of Interface Screen:

FIG. 1 is a diagram showing the interface screen of the video processing device as an embodiment. The video processing device is a device for producing digest video data, which is condensed from original video data composed of multiple frame images, on the basis of instructions by the user. The interface screen of FIG. 1 is a screen shown on the video processing device to enable input of user instructions.

In the embodiment, an image represented by frame image data will be termed a frame image. This frame image signifies a still image displayable in non-interlaced format. The video processing device produces digest video data in such a way that the digest video data playback time also conforms to user choice.

The Play button 201 shown on the interface screen 250a has the function of, when selected with the mouse, playing the video and displaying it in a view window 200. The Stop button 202 is a button that when selected, stops the video being played back.

The Digest button 203 is a button for determining that a frame image displayed in the view window 200 is a user-selected frame image which the user wishes to use in the digest video data. The Skip button 204 is a button with the function of, when selected, skipping from the playback position to a predetermined point in the video and playing back the video from that point while displaying it in the view window 200.

The Clear button 205 is a button with the function of, when selected, canceling determination of user-selected frame image(s) made with the Digest button 203. The Confirm button 206 is a button with the function of confirming the user-selected frame image(s) and initiating the process of producing digest video data on the basis of the user-selected frame image data in the video processing device.

The function of the Confirm button 206 may instead be assigned to the Stop button 202, and the Confirm button 206 may be omitted. The functions of the Digest button 203, Skip button 204, and Clear button 205 will be described in detail later. In the embodiment, the reference indicator may be displayed when the user designates a user-selected frame image with the Digest button 203. The reference indicator will be described in detail later.

The playback slide bar 208, together with the playback slider 207, constitute a slider that visually indicates to the user the playback position of the video; the total length of the playback slide bar 208 corresponds to the playback time of the video. On the playback slide bar 208, the playback position (hereinafter termed "designated clip") corresponding to the frame image data used in producing digest video data (hereinafter termed "designated frame data") is displayed in red. The base color of the playback slide bar 208 is white. This will be described in greater detail later.

The playback slider 207 moves rightward from the left end along the playback slide bar depending on the video playback position. For example, when several minutes have elapsed since video playback was started, in the view window 200 the ship will have moved in the direction of arrow pb. At this time, the playback slider 207 will have moved from the video playback start location in the direction of arrow pa, to the position of the playback slider 207a. The user, by moving the position of the playback slider 207 with the mouse, can designate a playback start location in the video.

In addition to the above, the interface screen may also be provided with buttons corresponding in function to the Fast Forward button, Rewind button, Frame Advance button, and Pause button provided to a video deck or the like.

A2. Arrangement of Video Processing Device:

FIG. 2 is a simplified illustration of the arrangement of the video processing device as an embodiment. The video processing device 100 is shown at the upper left, and function blocks of the video processing device 100 are shown at the lower right and left.

The video processing device 100 is an ordinary personal computer equipped with a display 150 as a device for outputting image. The video processing device 100 displays an interface screen 250 on the display 150. The video processing device 100 also comprises a keyboard 120 and a mouse 130 as devices for inputting information from the user. The video processing device 100 additionally inputs from the keyboard 120 and mouse 130 selection information for the various buttons described above, and so on.

A digital video camera 30 and a CD-R/RW drive 140 are provided as devices for inputting data to the video processing device 100. Drive devices which can read out data from various data storage media, such as a DVD drive, could be provided instead of or in addition to a CD-R/RW drive, as devices for inputting video data.

The video processing device 100, by means of an application program operating under the control of a predetermined operating system, implements the function blocks illustrated in FIG. 2, i.e. a digest video production control module 102, a data access module 104, a scene splitting module 106, a motion detecting module 107, an evaluation level calculating module 108, a reference establishing module 109, an interface providing module 110, a designated clip establishing module 114, a designated clip correcting module 117, an frame extracting module 118, and a digest video producing module 119. These functions may also be provided in the form of hardware.

The various functions are described below. The data access module 104 reads video data from a CD-RW in the CD-R/RW drive 140, from a digital video camera 30, from a hard disk (not shown), or the like and builds a video database 101 in RAM. The data access module 104 also acquires a desired playback time for the digest video, input by the user using the keyboard 120 or mouse 130, which it then stores in memory.

The scene splitting module 106 detects a break in a video scene and separates the video data into different scenes. The motion detecting module 107 calculates a motion vector by comparing frame images, or detects a moving block based on a motion vector.

The evaluation level calculating module 108 calculates evaluation levels described below, for each frame image based on a motion vector, moving block, or the like. The evaluation level is a value indicating the degree of importance of frame image data in video data. The reference establishing module 109, on the basis of the evaluation level of frame image data, establishes the location of the reference indicator as the location for displaying the reference indicator on the interface screen 250. The interface providing module 110 displays the interface screen 250 on the display 150, as well as realizing the various functions of the buttons etc. described previously. The reference indicator is displayed on the basis of the reference indicator display location established by the reference establishing module 109.

The designated clip establishing module 114, in accordance with a designated clip establishing instruction output by the interface providing module 110 on the basis of selection of the Digest button 203 mentioned previously, establishes a designated clip by means of updating a designated clip database (DB) 120. In the embodiment, it is assumed that there is a single designated clip in one scene. The designated clip correcting module 117, in accordance with a designated clip establishing instruction output by the interface providing module 110 on the basis of selection of the Digest button 203 mentioned previously, corrects a designated clip by means of correcting the designated clip database (DB) 120.

The frame extracting module 118, in accordance with an extraction instruction output by the interface providing module 110 on the basis of selection of the Confirm button 206, corrects the designated clip on the basis of desired playback time, and extracts frame image data corresponding to the corrected designated clip. The digest video producing module 119 joins together the extracted frame image data to produce digest video data, which is then output to the CD-RW in the CD-R/RW drive 140, to the digital video camera 30, or to the hard disk. The digest video production control module 102 provides overall control of digest video production operations of the modules described above.

In addition to the above, there may additionally be provided a display module for displaying the digest video on the display 150 by means of the digest video data.

A3. Calculation of Evaluation Levels:

The description now turns to calculation of evaluation levels for frame image data. The evaluation level calculating module 108 evaluates the frame image data in terms of the parameters of zooming, panning, still, position of moving objects, size of moving objects, and extent of flesh tone.

FIGS. 3(*a*) through 3(*g*) illustrate various evaluation levels of frame image data. FIG. 3(*a*) illustrates an example of five selected frame images from video. The frame images are in a time series, starting from the left. The frame images in FIG. 3(*a*) are not continuous. There are several frame images in the video between the nth (n=1 to 4) frame image from the left and n+1 frame image, although they are not illustrated. FIGS. 3(*b*) through 3(*g*) are graphs of temporal changes in the evaluation levels of frame image data for each parameter. The graph times correspond to time since the start of playback during video playback. In the graphs, the evaluation levels of the frame image data shown at the elapsed times during video playback are joined by a line. In the graphs, the evaluation levels for the frame image data in FIG. 3(*a*) are shown near the location under the center of the frame image.

FIG. 3(*b*) is a graph of the evaluation level "zoom." "Zoom" is the evaluation level related to zooming. Zooming is a camera operation that enlarges or shrinks the photographed subject. The evaluation level calculating module 108 calculates the evaluation level "zoom" using two functions called the zooming function and the end of zooming function. The zooming function is a linear function which tends to be positive, outputting greater "zoom" the greater the time since the start of zooming. The end of zooming function is a linear function which tends to be negative, outputting less "zoom" the greater the time since the start of zooming.

The evaluation level computing module 108 employs the zooming function until 30 frames after the end of zooming from the start of zooming, and employs the end of zooming function from 30 frames after the end of zooming. Only the gradient is determined in the end of zooming function. The intercept of the end of zooming function is determined by the evaluation level module 108 in such a way that the first "zoom" value determined by the end of zooming function is consistent with the final "zoom" value determined by the zooming function. The evaluation level module 108 uses the end of zooming function until the level is less than 0. When the "zoom" is less than 0, it is adjusted to 0. The evaluation level calculating module 108 assigns a value of 0 to the "zoom" of any frame image data which does not apply to the time until "zoom" less than 0 is output after the start of zooming.

Frame images during or immediately after zooming are considered frame images which the photographer deliberately photographed, and the zooming function is set as described above. Detecting methods for when zooming has started and after zooming has ended are described below.

Zooming to enlarge the image of the photographed subject is referred to as zooming in, while shrinking the image of the photographed subject is referred to as zooming out. The zooming and end of zooming functions are used for both zooming in and zooming out. In the frame images in FIG. 3(*a*), zooming in begins from the first frame image from the left and ends at the second frame image from the left. The evaluation level "zoom" of FIG. 3(*b*) thus changes as illustrated in the graph.

FIG. 3(*c*) is a graph of the evaluation level "pan." "Panning" is when the direction of the camera is altered to photograph a wide range while the camera position is fixed. The evaluation level calculating module 108 calculates the evaluation level "pan" by means of two panning functions. The two panning functions are structurally similar to the two previous zooming functions, and are used upon the detection of frame image data at the start and end of panning. The conditions for the times during which the two panning functions are used are the same as for the two zooming functions. The evaluation level calculating module 108 calculates 0 for "panning" other than times in which the panning functions are used. Frame images during or immediately after panning are considered frame images deliberately photographed by the photographer, and the panning functions are established as noted above. Detecting methods for when panning has started and after panning has ended are described below. Since no panning operations have been performed in the frame images in FIG. 3(a), the evaluation levels in FIG. 3(c) remain 0.

Figure 3A:
FIGS. 3(a) through 3(g) illustrate evaluation levels of frame images.
Figure 3B:
Figure 3C:
Figure 3D:
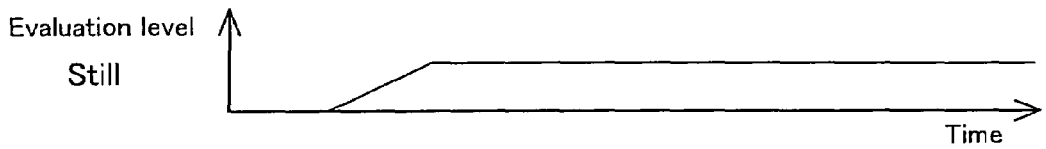

FIG. 3(d) is a graph of the evaluation level "still." "Still" is an evaluation level related to background movement. The evaluation level calculating module 108 calculates the evaluation level "still" by means of a function referred to as the still function. The still function is a function for outputting "still" when the extent of background motion (referred to below simply as the "extent of motion") is input. The still function outputs greater values the closer the speed is to 0. A value of 0 is output when the speed is over a certain level. Frame images of shots in which the background is still are considered frame images deliberately photographed by the photographer, and the still function is set as described above. A method for calculating background speed is described below. In the frame images in FIG. 3(a), the background motion gradually decreases until the second frame image from the left, and the background is still starting from the second frame image. The evaluation level in FIG. 2(d) thus changes as shown in the graph.

Figure 3E:

FIG. 3(e) is a graph of the evaluation level "moving object position." The "moving object position" is an evaluation level related to the position of moving objects (photographed subjects). As used below, the moving object is the largest moving object in the frame image. The evaluation level calculating module 108 calculates the evaluation level "moving object position" by means of a function referred to as the moving object position function. The moving object position function is a function outputting the evaluation level "moving object position" when the position of the moving object in the frame image is input. The moving object position function outputs greater values the closer the input value for the moving object position is to the center of the frame image. A value of 0 is calculated when a value outside a predetermined range including the center of the frame image is input for the moving object position. Frame images in shots where the moving object is in the center are considered frame images deliberately photographed by the photographer, and the moving object position function is set as described above. A method for calculating the position of moving objects is described below. In the frame images in FIG. 3(a), starting at the third frame image from the left, the moving object (person) gradually moves to the center of the frame image, and in the fourth frame image, the moving object (person) is located virtually in the center of the frame image. The moving object (person) then, from the fourth frame image, gradually moves from the center toward the left. The evaluation levels in FIG. 3(e) thus change as shown in the graph.

Figure 3F:
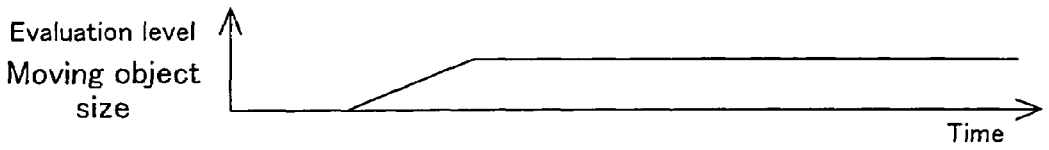

FIG. 3(f) is a graph of the evaluation value "moving object size." The "moving object size" is an evaluation level related to the size of the moving object in the frame image. The evaluation level calculating module 108 calculates the evaluation level "moving object size" by means of a moving object size function. The moving object size function is a function outputting the evaluation level "moving object size" when the size of the moving object in the frame image is input. The moving object size function outputs greater values the greater the input value is. The value 0 is calculated when a value under a certain level is input. Frame images in which the photographed moving object is large are considered frame images deliberately photographed by the photographer, and the moving object size function is set as noted above. A method for calculating the size of the moving object is described below. In the frame images in FIG. 3(a), the moving object gradually becomes bigger starting in the first frame image from the left. From the second frame image, the moving object stays a constant size. The evaluation levels in FIG. 3(f) thus change as shown in the graph.

Figure 3G:
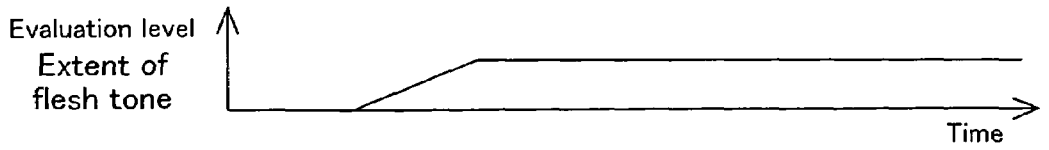

FIG. 3(g) is a graph of the evaluation level "extent of flesh tone." The "extent of flesh tone" is an evaluation level related to the extent of the flesh tones in the frame image. The evaluation level calculating module 108 calculates the evaluation level "extent of flesh tone" by means of a function referred to as the flesh tone extent function. The flesh tone extent function is a function outputting the evaluation level "extent of flesh tone" when the extent of the flesh tones in the frame image are input. The flesh tone extent function outputs greater images the greater the values that are input. The value 0 is calculated when a value under a certain level is input. Frame images in which a greater extent of flesh tone is photographed are considered frame images deliberately photographed by the photographer, and the level is set as described above. A method for calculating the extent of the flesh tones is described below. In the frame images in FIG. 3(a), the flesh tones gradually increase in the first frame image from the left, and the color tones stay at a constant level from the second frame image. The evaluation levels in FIG. 3(g) thus change as shown in the graph.

The functions used to calculate the evaluation levels above can be set in a variety of ways. For example, the still function for calculating the evaluation level "still" may output different levels depending on the number of frame image data after the background speed reaches 0. Similarly, different values for the position of the moving object may be output depending on the number of frame image data after the position of the moving object is in the center. In addition to the above evaluation levels, the evaluation calculating module 108 may output evaluation levels related to translation and moving speed of the moving object. Translation is when the moving object is in the center of the frame image and the background is moving, such as a marathon relay. The moving speed of the moving object is the relative speed of the moving object relative to the background. The value 0 is calculated for the moving speed of the moving object when the moving speed of the moving object is over a certain level. Additionally, the evaluation calculating module 108 may calculate evaluation values based on a histogram of frame image data color or luminance, on audio data, or the like, Methods for detecting the start and end of zooming, and the start and end of panning, are described below. The start and end of zooming, as well as the start and end of panning, are detected based on motion vectors. Motion vectors are vectors that indicate how much the pictures of each block, in which frame images are divided into a plurality, move between one frame image and another. The greater the movement of the pictures in the blocks, that is, the greater the motion vector of the blocks, the faster the moving objects portrayed by the pictures in the blocks are moving. A method for calculating motion vectors is described below. Motion vectors are described below as having already been calculated.

FIGS. 4(a) and 4(b) illustrate a method for detecting frame image data at the start and end of zooming, and FIG. 4(c) illustrates frame image data at the start and end of panning. In the video data, when the motion vectors m for each block, as illustrated in FIG. 4(a), begin to be oriented toward the center from outside the frame image, the evaluation level calculating module 108 determines that zoom in has begun, and the frame image data is detected as being frame image data in which zooming has begun. After zooming has started, when the motion vectors m for each block are not oriented from the outside the frame image toward the center as shown in FIG.

4(a), the frame image data is detected as being frame image data in which zooming has ended.

When the motion vectors m of each block begin to be oriented from the center of the frame image to the outside as in FIG. 4(b), the evaluation level calculating module 108 determines that zoom out has started, and the frame image data is detected as being frame image data in which zooming has begun. After zooming has started, when the motion vectors m for each block are not oriented from the center of the frame image toward the outside as shown in FIG. 4(b), the frame image data is detected as being frame image data in which zooming has ended.

The video data sometimes includes zoom button operating data as metadata indicating whether or not the video camera zoom button has been pressed. Frame image data in which zooming has begun or ended may thus also be detected on the basis of such zoom button operating data.

Frame images in which panning has begun or ended are detected based on the shift S of the frame image as a whole. The shift S is a vector indicating how much the frame image as a whole moves between one frame image and another. The greater the rate at which the video camera direction changes, the greater the magnitude of the shift S. When the direction of the shift S is the same in a certain number of frame images which are continuous in a time series as illustrated in FIG. 4(c), panning is determined to have begun. The first frame image data among the frame image data with shift S in the same direction is detected as being frame image data in which panning has begun. The last frame image data among the frame image data with shift S in the same direction is detected as being frame image data in which panning has ended.

Methods for calculating the background speed in frame images, the position of the moving object, and the size of the moving object are described below. These values are calculated based on moving object blocks that are collections of blocks in which the size of the motion vector is greater than a certain value. The picture portrayed by the moving object blocks is assumed to be of a moving object. When there are more than one moving object in a frame image, blocks in which the size of the motion vector is greater than a certain value are clustered to determine a plurality of moving object blocks representing a moving object. FIG. 5 illustrates a moving object mv.

The evaluation level calculating module 108 calculates the background speed by means of the size of the motion vectors of blocks other than the moving object blocks (referred to below as background blocks). The total size of the motion vectors of the background blocks may be used as the background speed, and the average size of the motion vectors of the background blocks may be used as the background speed. Here, the average value is used as the background speed.

The evaluation level calculating module 108 calculates the center of gravity of the moving object block(s) as the position of the moving object. The evaluation level calculating module 108 also calculates the size of the moving object block(s) as the size of the moving object. When there are more than one moving object blocks, the size of the moving object may be the size of the total moving object blocks.

A method for detecting the extent of the flesh tones is described below. The flesh tone area can be determined as the aggregate of pixels having RGB values meeting G>B and 0.1<H<0.9 where H is given in the following formulas.

$$H \text{ (hue)} = 1.732 \, (G-B)/(2R-G-B) \quad (1)$$

$$S \text{ (saturation)} = \{(B-R)^2 + (R-G)^2 + (G-B)^2\}/3 \quad (2)$$

$$V \text{ (brightness)} = R+G+B \quad (3)$$

The evaluation level calculating module 108 calculates the number of pixels of flesh tones in the frame image as the extent of the flesh tones. The extent of the flesh tones may also be the number of pixels of flesh tones in the moving object block.

The evaluation level calculating module 108 adds up evaluation levels of the parameters determined above for each frame of frame image data. Hereinbelow, "frame evaluation level" refers to this total evaluation level.

Figure 6:
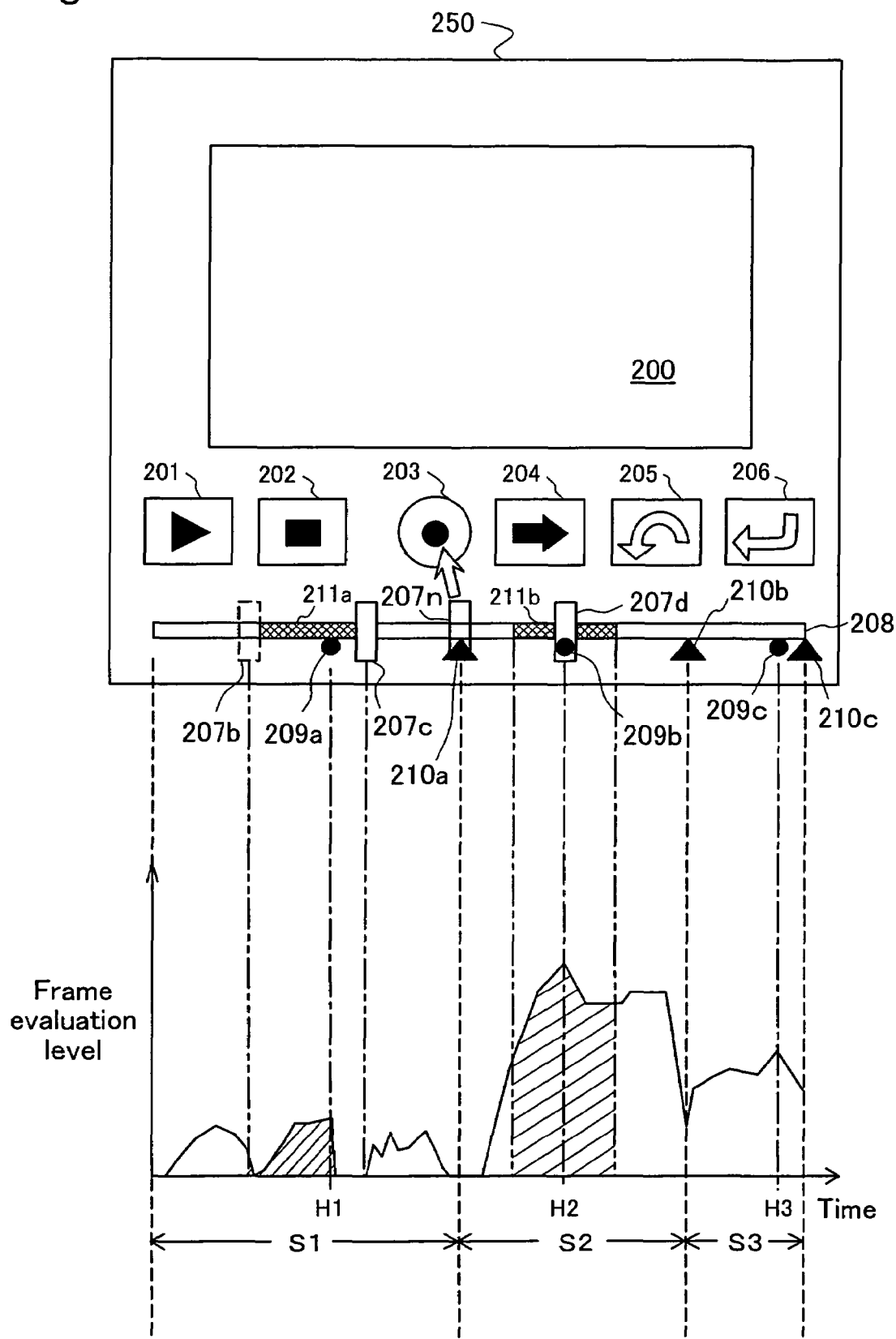
FIG. 6 illustrates establishment of a reference indicator and establishment of designated clip.

A4. Reference Indicator and Button Functions:

FIG. 6 is a diagram depicting establishment of reference indicator location and establishment of designated clip. At top in FIG. 6 is shown an interface screen 250 on which a reference indicator is displayed; at bottom, for convenience in description, a graph indicating the frame evaluation level is shown. The time axis of the graph corresponds to playback position in the video. This graph may be displayed together with the interface screen 250.

The video data is divided into scenes by means of the scene splitting module 106. In the illustrated example, the video data is divided into three scenes, namely, Scene S1, Scene S2, and Scene S3.

In the embodiment, two types of reference indicators are used. One is a Best-frame or Most-valuable-frame indicator 209a, 209b, 209c indicating playback positions of frame image data having the highest frame evaluation level within a scene. Frame image data corresponding to time H1 in Scene S1, to time H2 in Scene S2, and to time H3 in Scene S3 represents the frame image data with the highest frame evaluation level. The other type of indicator is a Division indicator 210a, 210b, 210c indicating separation between scenes. In the embodiment, a Division indicator 210c is shown at the playback completion location of the video as well. Reference indicator types are not limited to the two types discussed above, it being possible to establish reference indicators of various other kinds. These reference indicators are displayed below the playback slide bar 208.

The reference establishing module 109, on the basis of the frame evaluation levels, identifies frame images for which Best-frame indicators and Division indicators should be displayed. On the basis of the type and location of the reference indicators, the interface providing module 110 displays Best-frame indicators 209a, 209b, 209c and Division indicators 210a, 210b, 210c.

When the user presses the Digest button 203, the interface providing module 110 determines the frame image being played back in the view window 200 at that point in time to be the user-selected frame image data, and sends a designated clip establishment instruction to the designated clip establishing module 114.

The designated clip establishing module 114, on the basis of the designated user-selected frame image data, establishes a designated clip. In the embodiment, a set of frame image data that are consecutive in a time series lying between two frames of user-selected frame image data are established as the designated clip. The designated clip establishing module 114 subjects the two user-selected frame images that correspond to the start and end of the designated clip to administration in the designated clip DB 120. In the embodiment, there is a single designated clip in one scene, but several designations is acceptable. Once designation is completed, the designated clip establishing module 114 commences playback of the video from the next scene.

For example, in the event that during video playback, the Digest button 203 is pressed at the times that the playback slider is at locations 207b, 207c, the segment lying between these locations, i.e. the segment 211a indicated by the cross-hatching in Scene S1, is established as the designated clip, and is displayed in red. Hereinafter, a segment corresponding to a designated clip on the slide bar will be termed a designated segment. Subsequently, the playback slider moves to location 207n, and commences playback of Scene S2.

Alternatively, a predetermined number of frame images centered on the user-selected frame image may be established as the designated clip. Specifically, in the event that the Digest button 203 is pressed at the time that the playback slider is at location 207d, a video clip corresponding to a predetermined number of frame images coming before and after this frame image, the segment 211b indicated by the cross-hatching in Scene S2, may be established as the designated clip. This predetermined number may be specified by the user, or determined on the basis of frame evaluation levels.

Figure 7:
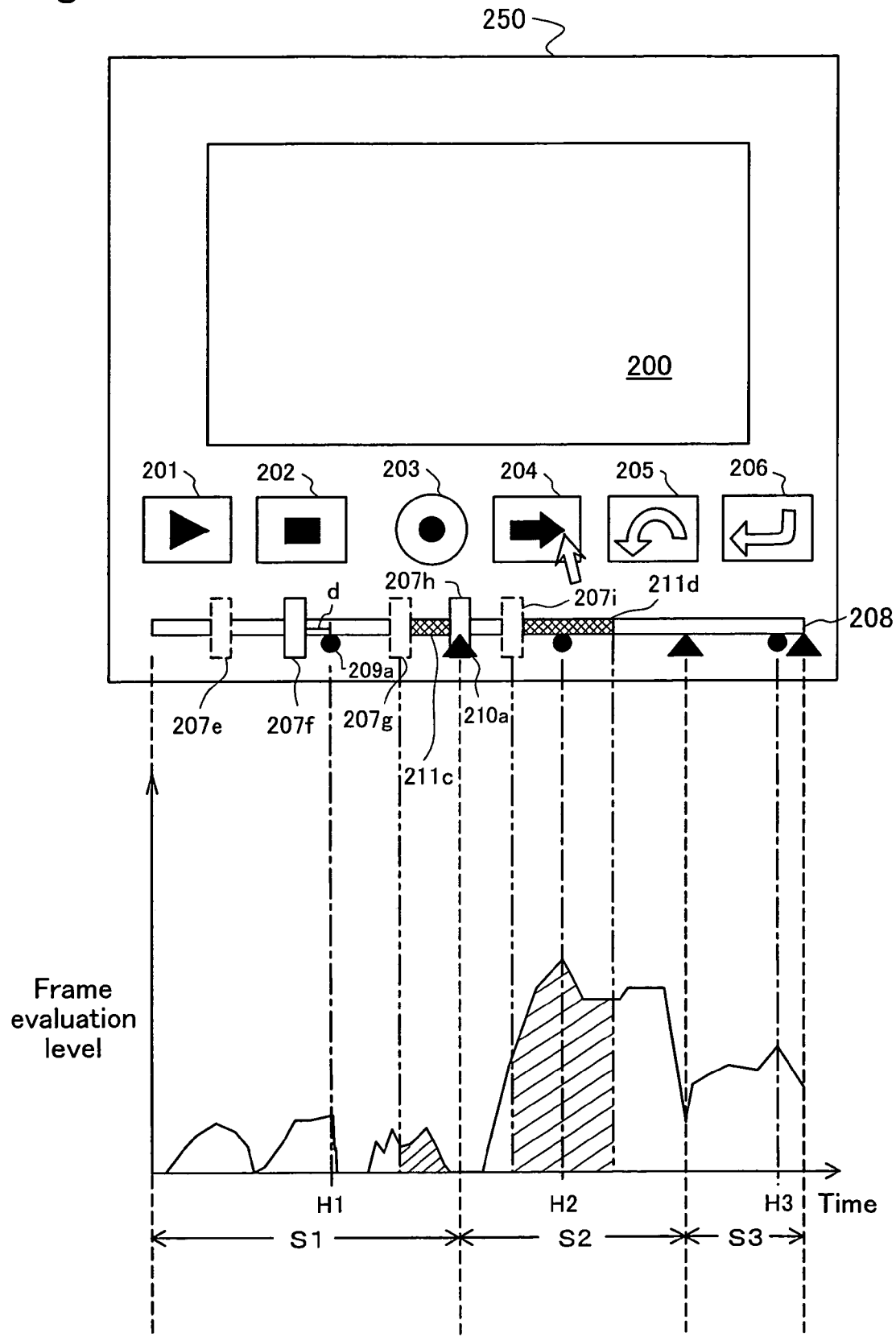
FIG. 7 illustrates the function of the Skip button 204.

FIG. 7 is an illustration showing the function of the Skip button 204. In the event that the Skip button 204 is pressed during video playback, the interface providing module 110 moves the playback position of the video. Specifically, it plays back the video from a location in the playback slide bar 208 that is situated rightward by a distance d from the Best-frame reference indicator, at the location of a Division indicator, or at a location at the left end of the designated segment, whichever is closest to the current playback position.

For example, if the Skip button 204 is pressed when the playback slider is at location 207e, the interface providing module 110 moves the playback slider to location 207f at the left side d of Best-frame reference indicator 209a, and commences video playback from this point. Since it is difficult for the user to ascertain the content of a frame image even if playback is carried out from the frame image of a Best-frame reference indicator, playback takes place from a location to the left side d of the Best-frame reference indicator. The value of d can be established arbitrarily within a range proportional to a preview display from start of playback until the frame image of the Best-frame reference indicator is reached.

If the Skip button 204 is pressed when the playback slider is at location 207g, the interface providing module 110 plays back the video from location 207h corresponding to a Division indicator.

There may be instances in which after the user has established a designated clip, but prior to production of digest video data, the video is again played back in order to verify the designated clip. In the event that a designated segment 211d has already been established, if the Skip button 204 is pressed when the playback slider is at location 207h, the interface providing module 110 plays back the video from location 207i corresponding to the starting frame of the designated segment 211d.

The Skip button 204 has one additional function. In event that, after user-selected frame image corresponding to the start location of a designated segment has been designated by pressing the Digest button 203, the Skip button 204 is then pressed, the playback position after the skip will be established at the end location of the designated segment.

For example, if the Skip button 204 is pressed after the Digest button 203 has been pressed when the playback slider is at location 207g, with segment extending from location 207g to the location 207h after the skip as the designated segment 211c, the segment corresponding to this will be established as the designated clip, and this segment displayed in red.

Figure 8:
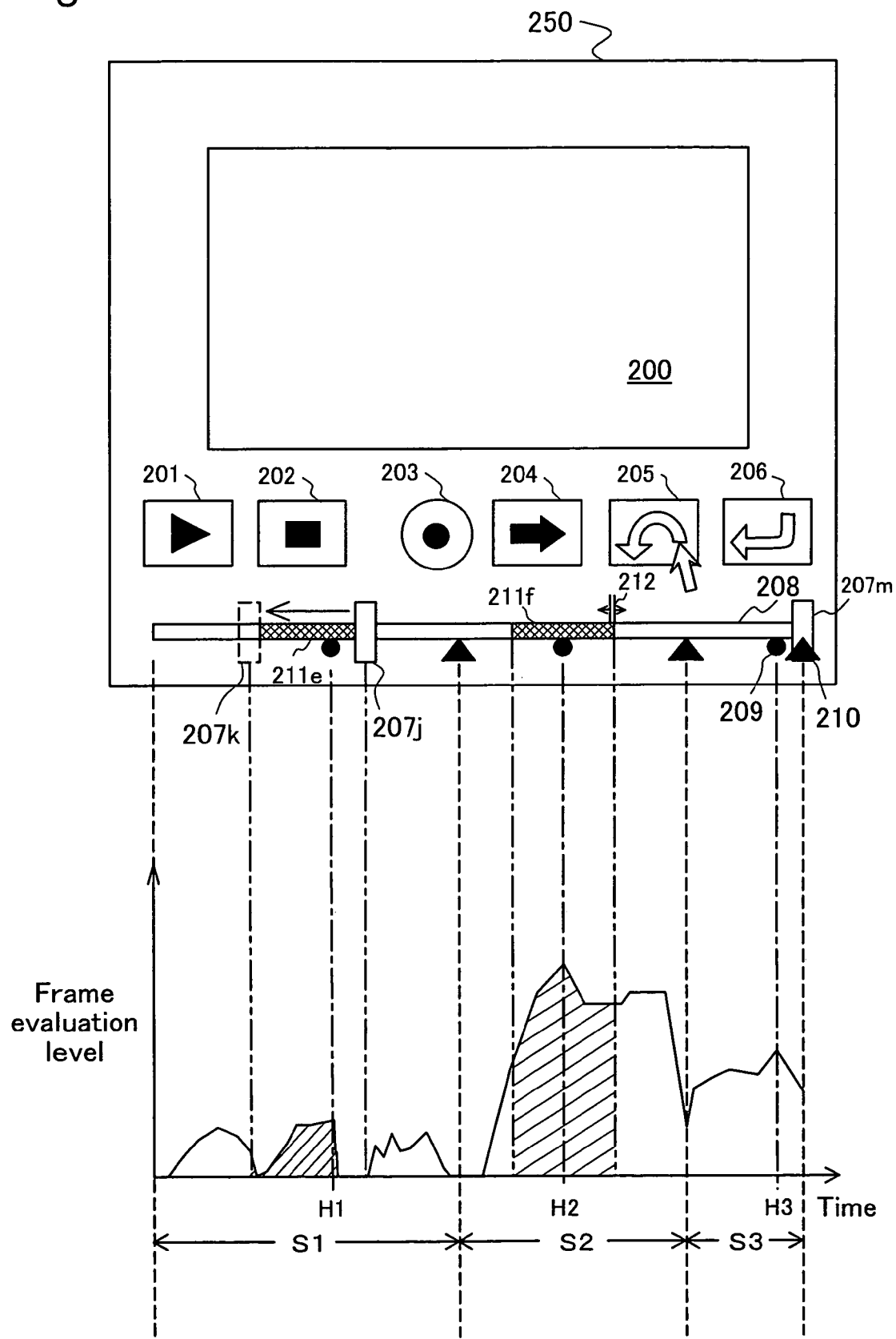
FIG. 8 illustrates the function of the Clear button 205.

FIG. 8 is an illustration showing the function of the Clear button 205. The Clear button 205 has the function of canceling determination of the user-selected frame image. Specifically, in the event that the Clear button 205 is pressed during the interval after the first frame image has been designated, until the second frame image is designated, designation of the first frame image will be canceled. In response to clearing the interface providing module 110 returns the playback position to the first user-selected frame image.

For example, after designating a first user-selected frame image at location 207k, in the event that the Clear button 205 is pressed with the playback slider now at location 207j, the designated clip correcting module 117 deletes the information relating to the first user-selected frame image from the designated location data base 120. The designated segment 211e returns to its original white color. The interface providing module 110 then moves the playback position to a point corresponding to the location of the playback slider 207k.

An arrangement whereby, once the playback slider reaches the location 207m after finishing playback of a video, the designated clip is adjustable via the interface screen 250 is also possible. For example, the designated clip corresponding to the designated segment 211f may be made adjustable by means of moving the end of the designated segment 211f within the playback slide bar 208, by means of an adjuster 212.

Figure 9:
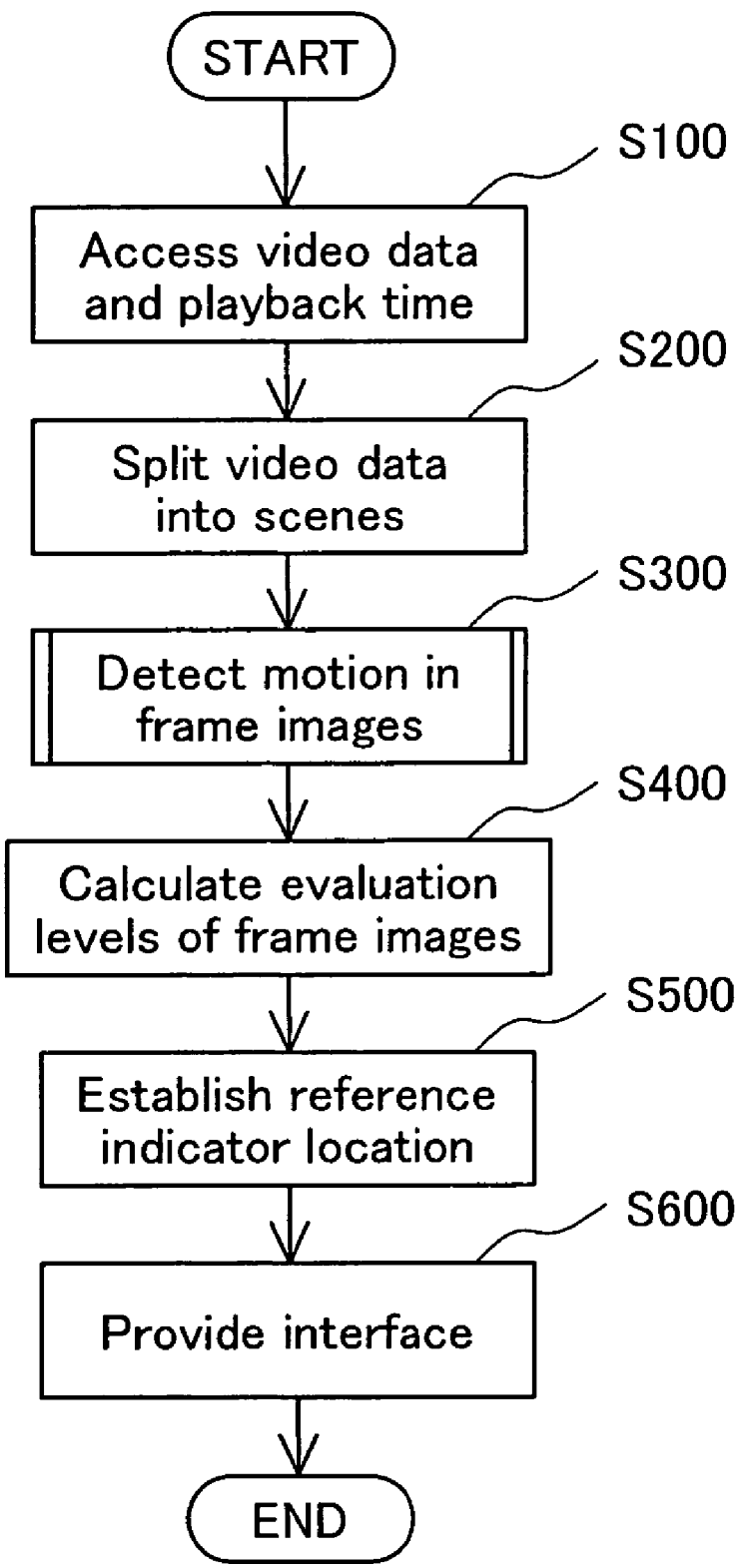
FIG. 9 illustrates the interface providing process which is part of the digest video data production process.

A5. Processing Flow:

Processing flow of the video processing device 100 is now described. FIG. 9 is an illustration showing the interface providing process which is part of the digest video data production process. First, as a result of user input, the video processing device 100 acquires video data and the desired playback time of the digest video (Step S100). the acquired video data is then split into scenes (Step S200). Scenes are split by the known technique of comparing frame image data using a characteristic value of video data, such as color or brightness histogram, or audio data.

Figure 10:
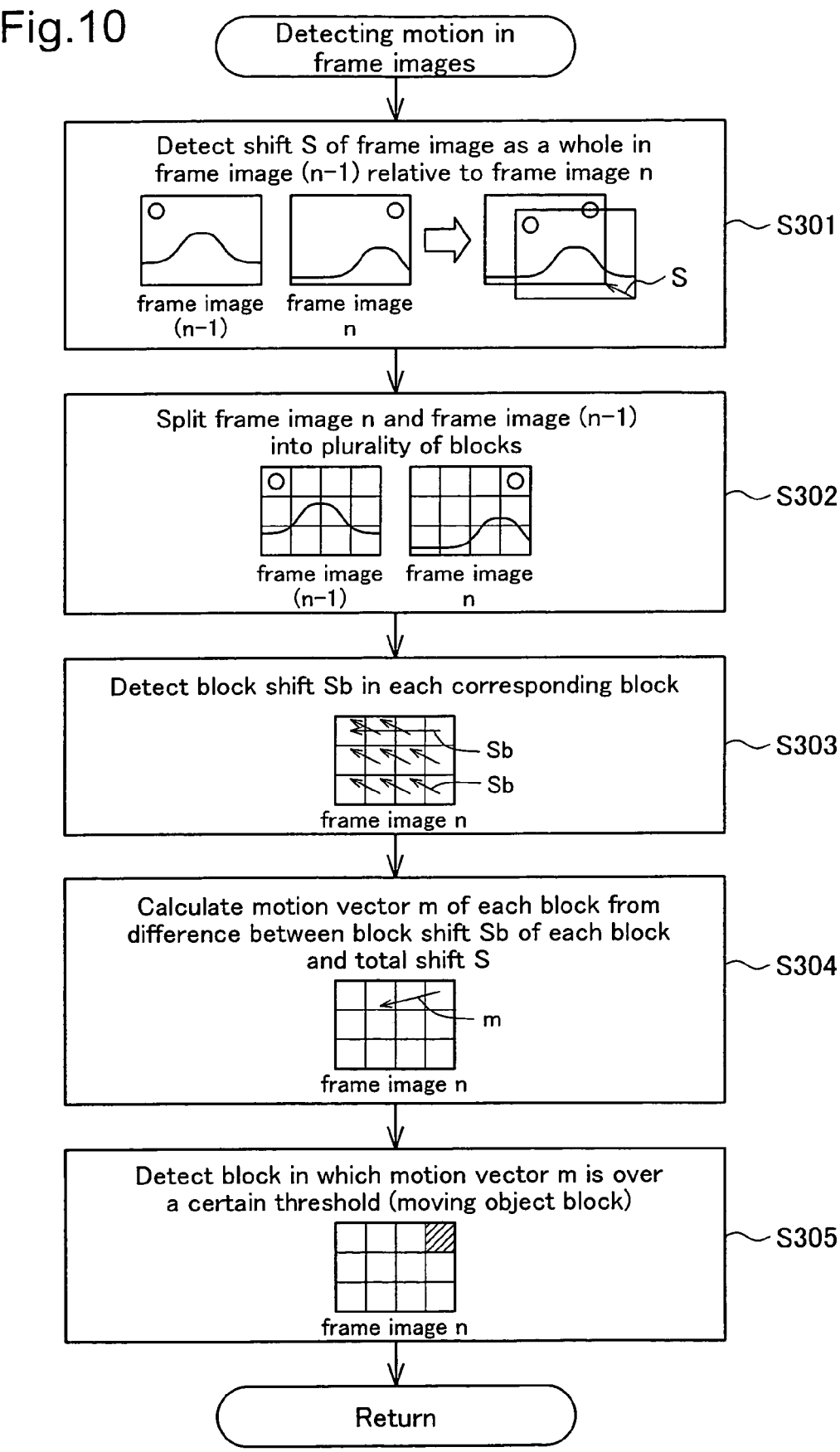
FIG. 10 is a flowchart showing the frame image motion detection process.

The motion of the frame images is then detected (Step S300). FIG. 10 is a flow chart of the process for detecting motion in the frame images. In this process, the video processing device 100 first selects a reference frame image n for motion detection from among the plurality of frame images in the video, and detects the shift S of the frame images as a whole between the reference frame image n and the immediately preceding frame image (n−1) (Step S301). The shift S can be detected, for example, by using a known technique such as a gradient method or pattern matching. The shift S detected here corresponds to the shift S described above for detecting panning.

In the example in the figure, the moving object is a ball photographed in frame image (n−1) and reference frame image n against a mountain as the background. When the frame image (n−1) and the reference frame image n are compared, the mountain moves to the lower right of the frame image, and the ball moves toward the right in the frame image. It can be seen that the extent to which the ball moves is relatively greater than the extent to which the mounting moves, and that the area of the mountain in the frame image is greater than the area of the ball. With the application of a gradient method or pattern matching to such frame images, the shift of the mountain which has a greater proportion of area in the frame image overall will be detected preferentially over the shift of the ball which has a smaller area in the frame image overall. In other words, the shift of the frame image as a whole will correspond almost entirely to the shift of the mountain.

Although translation shift in the vertical and lateral directions and rotational shift in the rotating direction can also occur between the two frames, for the sake of simplicity, the description will be given as if no rotational shift had occurred.

After the shift S of the frame images as a whole has been detected, the video processing device 100 splits the reference frame image n and immediately preceding frame image (n−1) into a plurality of blocks (Step S302). The figure shows an example in which the frame images are divided in four laterally and in three vertically.

After the frame images have been split, the video processing device 100 detects the block shift Sb of the each block in the frame image (n−1) corresponding to the blocks of the reference frame image n (Step S303), and obtains the difference between the block shift Sb of those blocks and the total shift S to calculate the motion vector m for each block (Step S304). The motion vectors m calculated here correspond to the motion vectors m for detecting zoom in and zoom out described above. In the illustrated example, the block shift Sb of blocks other than the upper right block in which the ball has been photographed is cancelled because it is virtually equivalent to the shift S of the frame images overall detected in Step S301, and the motion vector m is zero, allowing only the motion vector m of the upper right block to be detected.

The video processing device 100 then determines whether or not the motion vector m is greater than a certain threshold, and the block in which the motion vector m is greater than the certain threshold is detected as the moving object (Step S305). The block in which the moving object is detected correspond to the moving object block for detecting "still", the position of the moving object, or the size of the moving object as described above. The threshold is established to eliminate minor shift (such as minimal rotating shift) between blocks. The threshold can be 30 pixels, for example. In the illustrated example, it is specified as that in which the upper right block in the reference frame image n is the moving object block.

The process in Steps S301 through S305 are carried out on all frame image data other than the first frame image data in the video data.

The description now returns to FIG. 9. The video processing device 100 then calculates evaluation levels for the frame image data, on the basis of the shift S detected in Step S300, the motion vector m, and the moving object block (Step S400). The calculation method is the same as that described in the preceding section A3, with the evaluation level calculating module 108 calculating evaluation levels for the parameters of zoom, pan, still, position of a moving body, size of a moving body, and size of flesh tone. These are then added up to arrive at a frame evaluation level. On the basis of the calculated frame evaluation level, the location of the reference indicator is established (Step S500). Additionally, an interface screen 250 for realizing the functions described above, and having a reference indicator displayed on the basis of the reference indicator location, is provided (Step S600).

Figure 11:
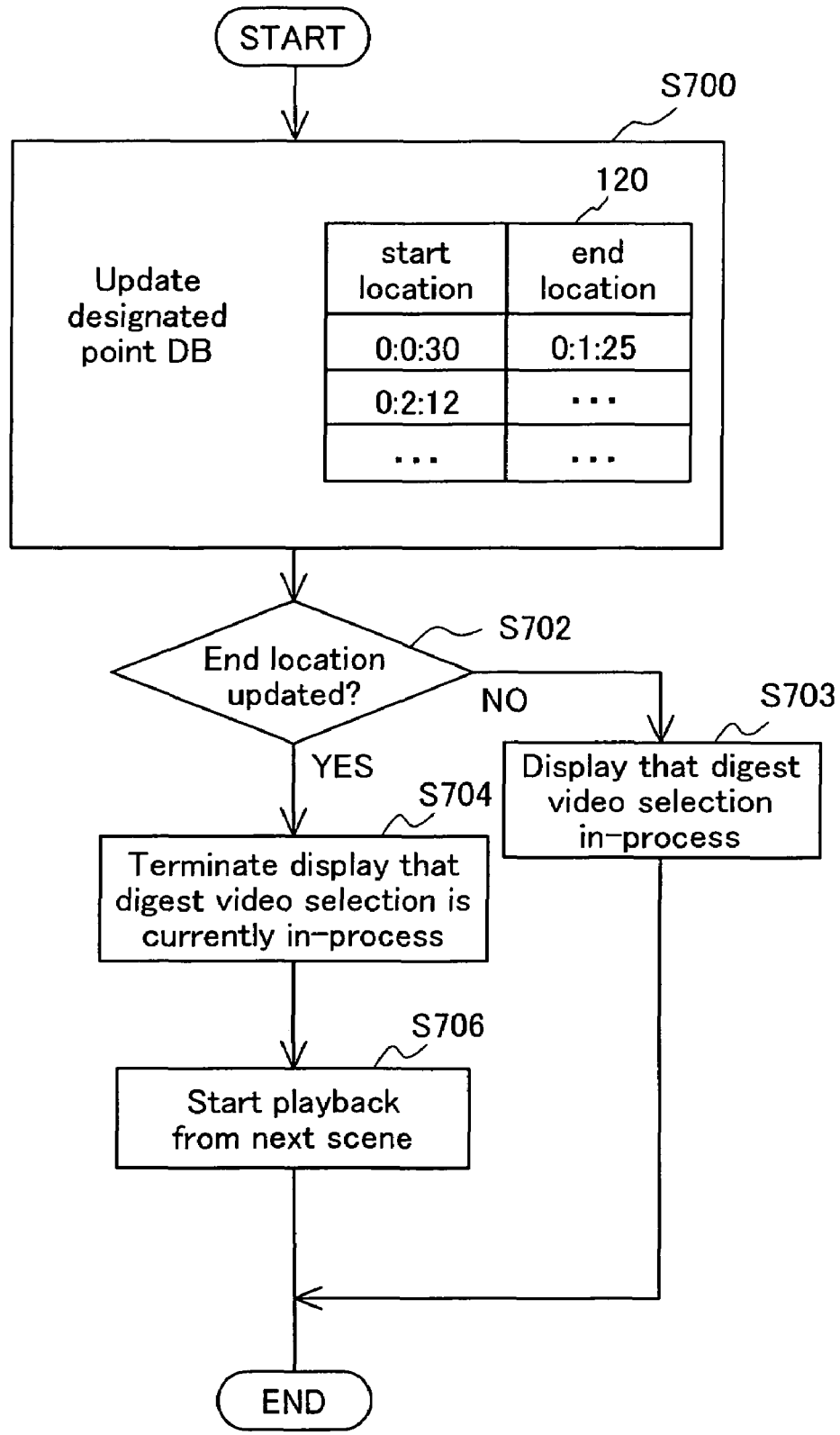
FIG. 11 is a flowchart showing the designated clip establishing process.

FIG. 11 is a flowchart showing the designated clip establishing process. The designated clip establishing process is executed by the designated clip establishing module 114, on the basis of a designated clip establishment instruction from the interface providing module 110. When the Digest button 203 or the Skip button 204 is pressed, the interface providing module 110 outputs information relating to the user-selected frame image data—e.g. the playback segment of the video when the button was pressed—as well as a designated clip establishment instruction, to the designated clip establishing module 114.

Upon receiving the designated clip establishment instruction, the designated clip establishing module 114 updates the designated clip data base 120 on the basis of information relating to the user-selected frame image data (Step S700). The information relating to the user-selected frame image data is the time stamp of the user-selected frame image data. The designated clip establishing module 114 stores the time stamp in the designated clip DB 120. At this juncture, designating the time stamp of the first user-selected frame image described previously as the "start location", the time stamp of the second user-selected frame image is stored as the "end location."

Here, the information stored in the designated clip DB 120 is in "hour:minute:second" format, but could instead be stored in "hour:minute:second:millisecond" format, or information to the effect that the user-selected frame image data is at the nth location from the lead of the video data could be stored.

In the event that the start location has been updated (Step S702: NO), the designated clip establishing module 114 displays to the user that digest video selection is currently in-process (Step S703). Specifically, in order to display the designated segment, in association with movement of the playback slider, the playback slide bar 208 is displayed in red beginning at the location corresponding to the first user-selected frame image. By way of a comment, there may be displayed in the interface screen 250 a message indicating that digest video selection is currently in-process. A marker may be displayed on the playback slide bar 208 as well.

In the event that the end location has been updated (Step S702: YES), the designated clip establishing module 114, on the assumption that a designated clip has been established, terminates display to the effect that digest video selection is currently in-process (Step S704). The playback slider is them moved to a location corresponding to the start location of the next scene, and playback of the next scene commences (Step S706).

Figure 12:
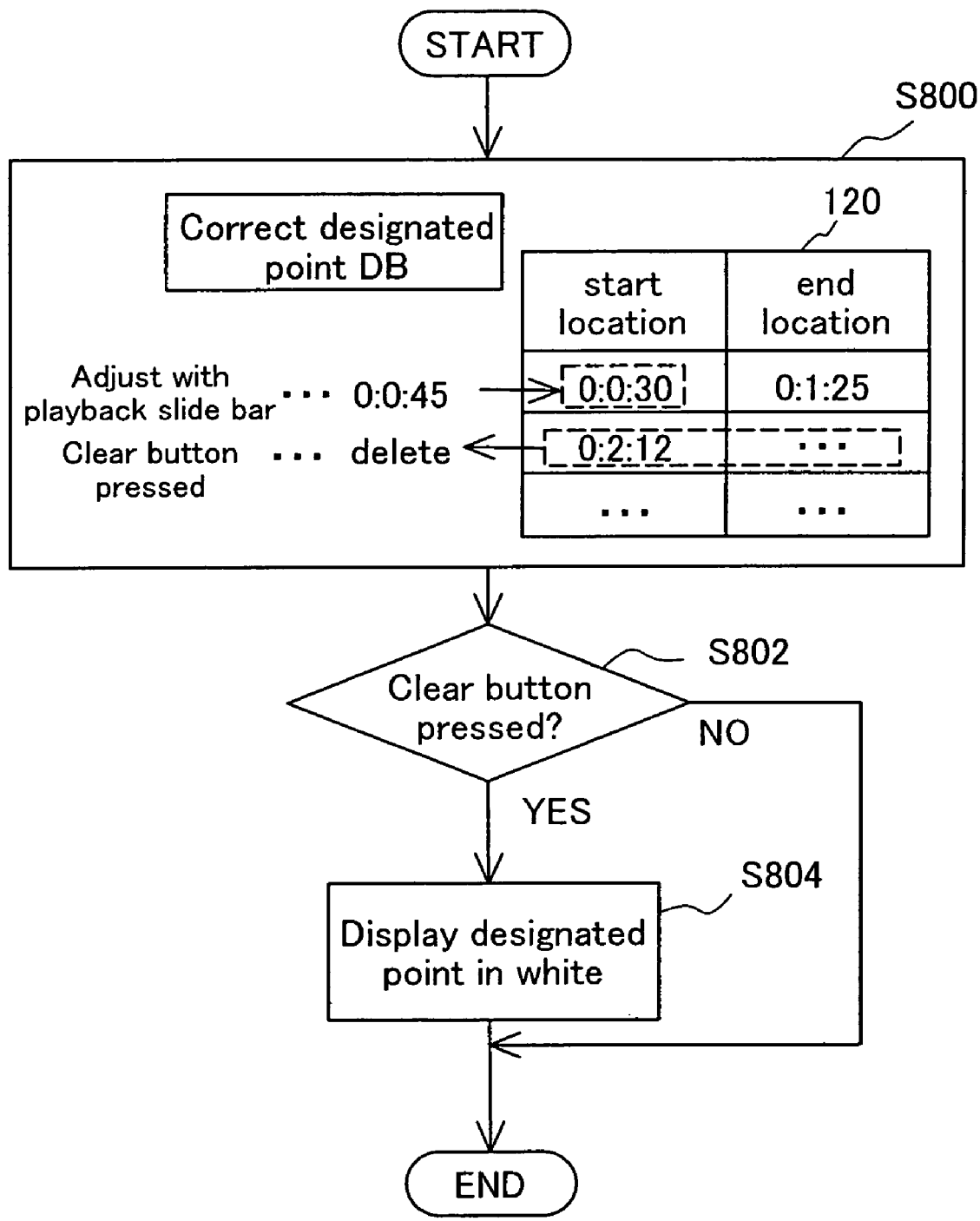
FIG. 12 is a flowchart showing the designated clip correction process.

FIG. 12 is a flowchart showing the designated clip correction process. The designated clip correction process is executed by the designated clip correction module 117, on the basis of a designated clip completion instruction from the interface providing module 110. When the Clear button 205 is pressed, or the width of the designated segment 211 in the slide bar 208 is adjusted, the interface providing module 110 outputs the content of the operation, i.e. "Clear button pressed" or "designated segment adjustment", and information relating to the user-selected frame image, to the designated clip correction module 117 together with the designated clip correction instruction.

Upon receiving the designated clip correction instruction, the designated clip correction module 117 corrects the designated clip DB 120 on the basis of content of the operation and information relating to user-selected frame image (Step S800). Here as well, the information relating to user-selected frame image may be the time stamp of the user-selected frame image. Specifically, where the content of the operation is "designated segment adjustment", the designated clip correction module 117 replaces information relating to user-selected frame image prior to modification (0:00:30 in FIG. 12) with information relating to user-selected frame image subsequent to modification (0:00:45 in FIG. 12). Where the content of the operation is "Clear button pressed," information relating to user-selected frame image (0:2:12 in FIG. 12) is deleted.

Also, where the content of the operation is "Clear button pressed" (Step S802: YES), the designated segment 211 corresponding to the deleted user-selected frame image turns white (Step S804).

Figure 13:
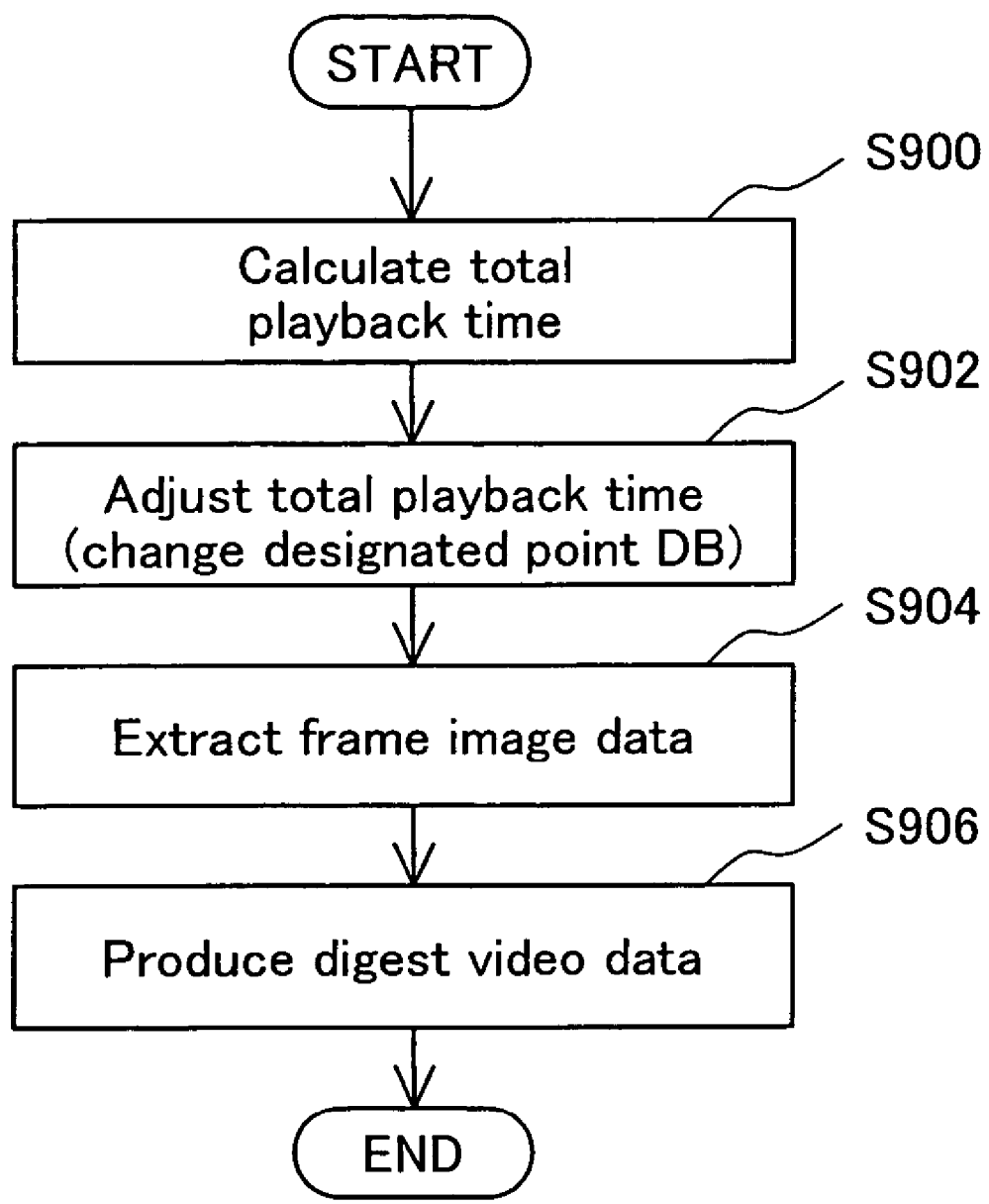
FIG. 13 is a flowchart showing the digest video data production process.

FIG. 13 is a flowchart showing the digest video data production process. The digest video data production process is a process executed by the frame extracting module 118 and the digest video producing module 119, in accordance with an extract instruction output by the interface providing module 110 on the basis of selection of the Confirm button 206. When the frame extracting module 118 receives an extract instruction, it calculates from the designated clip DB 120 the total playback time of the designated clips (Step S900).

The designated clips are then corrected on the basis of the desired playback time, and total playback time is adjusted (Step S902). Correction of designated clips is carried out, for example, by assigning the time difference between the desired playback time and the total playback time equally to designated clips, with the "start location" and "end location" each being moved by half the assigned value. By so doing, desired playback time can be made to coincide with total playback time. During this process, the designated clip DB 120 is also changed to the corrected value.

Alternatively, correction of designated clips may be carried out by moving only the "start location" or "end location" by the assigned value. Rather than assigning the time difference between the desired playback time and the total playback time equally to designated clips, the difference may be assigned on the basis of frame evaluation levels of the frame images in the designated clips. In the event that the time difference between the desired playback time and the total playback time exceeds a predetermined threshold value, the user may be prompted, and the digest video data terminated.

After correcting the designated clip DB 120, the frame image data corresponding to the corrected designated clip is extracted (Step S904). Once the frame image data has been extracted, digest video data is produced (Step S906). The digest video data is produced by joining together frame image data corresponding to the extracted designated clips.

The produced digest video data can be output to the digital video camera 30 or CD-R/RW drive 140. The user can then view the digest video by playing back the output digest video data with the digital video camera 30 etc. Video may also be played back displayed in the view window 200.

After correction of the designated clip DB 120, display of color of designated segments on the basis of the designated clip DB 120 may be carried out on the interface providing module 110.

According to the video processing device 100 of the embodiment hereinabove, the user, referring to Best-frame indicators 209 or Division indicators 210 can easily designate user-selected frame image for use, and generate digest video data from it. Since a Skip button 204 is provided, it is possible to easily fast-forward video to a playback position corresponding to the location of a reference indicator, and user-selected frame image data can be designated quickly and easily. Since after a clip in one scene has been designated, playback starts from the next scene automatically, operation is easy.

Additionally, the provision of a Clear button 205 makes it easy to change designated clips. In the embodiment, since a designated clip can be designated in its entirety by means of designating a start location and an end location with a single operation of the Digest button 203, operation is simple.

B. Modifications:

While the invention has been shown hereinabove with reference to a certain embodiment, the invention is not limited thereto, with various other arrangements being possible within the scope and spirit thereof. The number of designated clips is not limited to one per scene. Two or more are possible, as is zero. The Skip button 204 of the embodiment is a Skip button equivalent to video fast-forward; however, a Skip button that equivalent to video rewind may be provided as well. The playback position after skipping may be user-selectable, by means of specifying the skip time for example.

Figure 14:
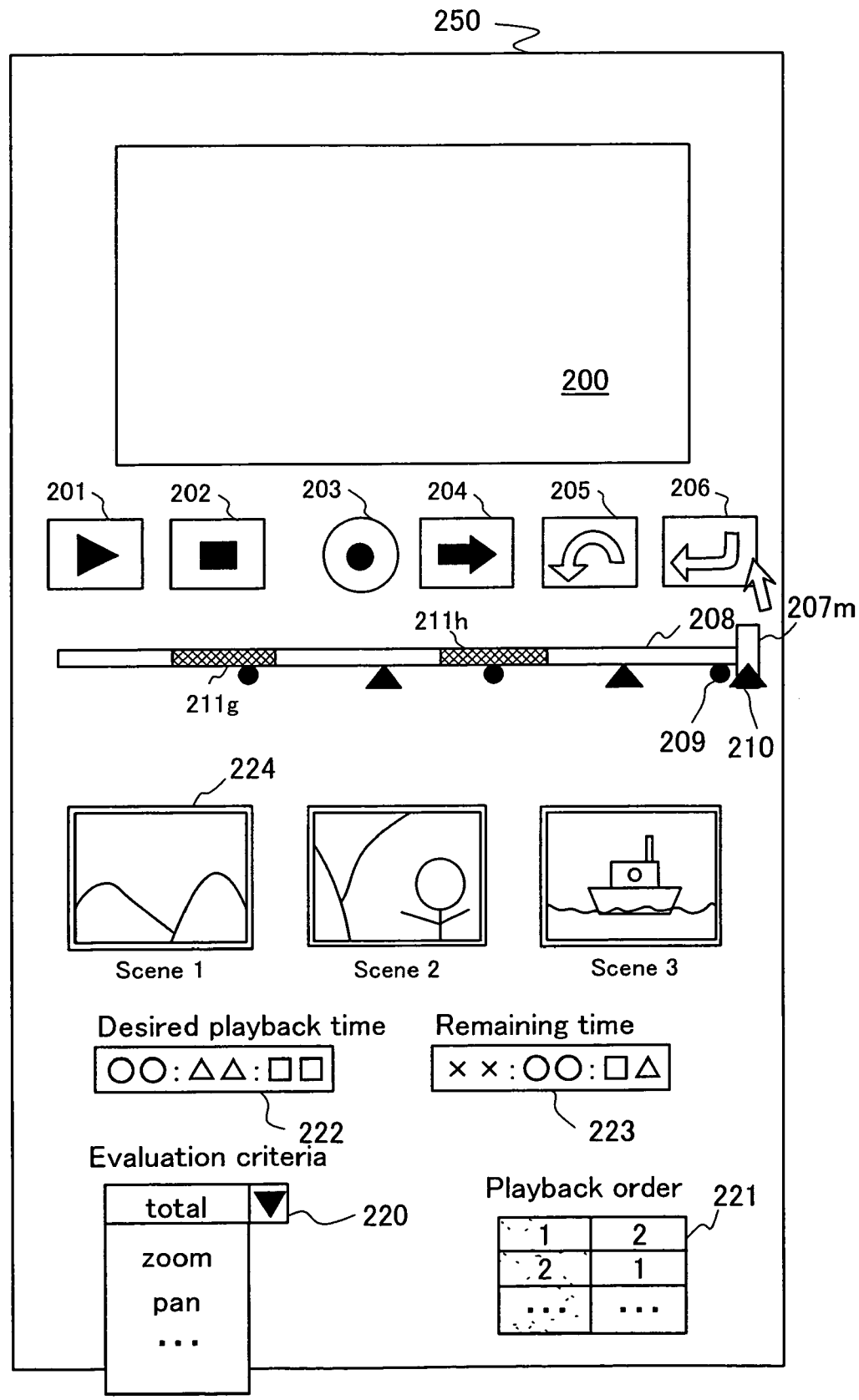
FIG. 14 illustrates a modification of the embodiment.

FIG. 14 is an illustration of a modification of the embodiment. The interface screen 250 may include sample image windows 224 for displaying sample images of scenes. In preferred practice, a sample image will be the frame image with the highest frame evaluation level within a scene, but may be otherwise. A desired playback time display area 222 for displaying desired playback time may be provided as well. Additionally, a remaining time display area 223 for displaying "total of desired playback time minus designated clip playback time" may be provided. By referring to this display, the user can readily specify user-selected frame image.

An evaluation criterion selection area 220 enabling selection of an evaluation criterion for use when calculating frame evaluation levels may be provided as well. Where the evaluation criterion selection area 220 is provided, Best-frame indicators can be displayed according to frame evaluation levels calculated with a user-selected evaluation criterion, allowing the user to refer to chosen Best-frame indicators when specifying user-selected frame image data for use.

A playback order instruction area 221 enabling instruction of a playback order for digest video of designated clips may be provided as well. In this case, the digest video producing module 119 would joint together the frame image data of the designated clips in accordance with the instruction.

The Digest button is not limited to one. For example, it is possible to provide separate buttons for designating the start location and the end location, respectively, of a designated clip. Further, the start location of each scene may be automatically determined to be the start location of the designated clip.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of producing digest video data from original video data including a plurality of frame images that are continuous in a time series, comprising the steps of:
  (a) calculating a frame evaluation level representing an importance of each frame image, the calculating of the frame evaluation level for each frame image including evaluating each frame image in terms of a plurality of parameters including zooming, panning, still, position of moving objects, size of moving objects, and extent of flesh tone, and adding up evaluation levels of the plurality of parameters for each frame image;
  (b) providing an interface screen for allowing a user to designate a user-selected frame image, which is desired to be used in the digest video data;
  (c) establishing, based on the frame evaluation levels of the frame images, reference indicator information representing an indicator display format of a reference indicator, which is to be presented on the interface screen to assist the user in specifying the user-selected frame image;
  (d) receiving designating information input by the user that designates the user-selected frame image; and
  (e) producing the digest video data including at least a portion of designated frame data which represent a series of frame images including the user-selected frame image,
  wherein the interface screen includes:
  a digest button for specifying one or more positions for designating the use-selected frame image;

an evaluation criterion selection area for enabling selection of an evaluation criterion for use when calculating the frame evaluation level;

a playback display area for playback of video based on the video data;

a playback position indication area for graphically indicating a playback position of the video data with a slide bar; and a reference indicator display area for displaying the reference indicator according to the reference indicator information, the reference indicator including a division indicator indicating separation between different scenes and a most-valuable-frame indicator indicating a frame position having the highest frame evaluation level within each scene, the play back position indication area further displaying on the slide bar a segment of the video portion designated by the digest button by the user wherein the segment is displayed distinct from the other portions of the video.

2. A method according to claim 1, wherein the reference indicator provides visual representation of the frame evaluation level.

3. A method according to claim 1, wherein the designated frame data includes a frame group which is a set of at least a predetermined number of frame images in a continuous time series.

4. A method according to claim 3, wherein the designating information designates foremost and endmost frame images in the frame group.

5. A method according to claim 1, wherein the designating information specifies a playback start position designated by the user, and the step (d) includes starting playback of the video from the playback start position.

6. A method according to claim 5, wherein the playback start position is designated by means of selecting a frame image among frame images associated with the reference indicator information, and the designated frame data.

7. A method according to claim 5, wherein the step (b) includes providing an interface, adjacent to an area for inputting the designating information within the interface screen, for allowing the user to designate the playback start position.

8. A method according to claim 1, wherein the step (d) includes, in response to input of the designating information, skipping the playback of video within the playback display area to a frame image associated with the reference indicator information and beginning the playback of the video again.

9. A method according to claim 1, further comprising the steps of:

receiving correction information input by the user for correcting the designating information; and correcting the designated frame data based on the correction information.

10. A method according to claim 1, wherein the playback position indication area has a designated clip indication for indicating, in a manner distinguishable from other frame image positions, a video clip corresponding to the designated frame data.

11. A method according to claim 10, further comprising the steps of:

receiving a change in location of the designated clip indication; and correcting the designated frame data based on the change in the location of the designated clip indication.

12. A method according to claim 1, further comprising the steps of:

acquiring a desired playback time of the digest video data; and adjusting length of the designated frame data based on the desired playback time.

13. A device for producing digest video data from original video data including a plurality of frame images that are continuous in a time series, comprising:

a frame evaluation level calculating module configured to calculate a frame evaluation level representing an importance of each frame image, the frame evaluation level calculating module calculating the frame evaluation level for each frame image by evaluating each frame image in terms of a plurality of parameters including zooming, panning, still, position of moving objects, size of moving objects, and extent of flesh tone, and adding up evaluation levels of the plurality of parameters for each frame image;

an interface providing module configured to provide an interface screen for allowing a user to designate a user-selected frame image, which is desired to be used in the digest video data;

a reference indicator establishing module configured to establish, based on the frame evaluation levels of the frame images, reference indicator information representing an indicator display format of a reference indicator, which is to be presented on the interface screen to assist the user in specifying the user-selected frame image;

a designation input module configured to input designating information that designates the user-selected frame image; and a digest video producing module configured to produce the digest video data including at least a portion of designated frame data which represent a series of frame images including the user-selected frame image, wherein the interface screen includes:

a digest button for specifying one or more positions for designating the use-selected frame image;

an evaluation criterion selection area for enabling selection of an evaluation criterion for use when calculating the frame evaluation level;

a playback display area for playback of video based on the video data;

a playback position indication area for graphically indicating a playback position of the video data with a slide bar; and a reference indicator display area for displaying the reference indicator according to the reference indicator information, the reference indicator including a division indicator indicating separation between different scenes and a most-valuable-frame indicator indicating a frame position having the highest frame evaluation level within each scene, the play back position indication area further displaying on the slide bar a segment of the video portion designated by the digest button by the user wherein the segment is displayed distinct from the other portions of the video.

14. A computer readable medium storing a computer program for producing digest video data from original video data including a plurality of frame images that are continuous in a time series, the computer program comprising:

a program for causing a computer to calculate a frame evaluation level representing an importance of each frame image, the program causing the computer to calculate the frame evaluation level for each frame image by evaluating each frame image in terms of a plurality of parameters including zooming, panning, still, position of moving objects, size of moving objects, and extent of flesh tone, and adding up evaluation levels of the plurality of parameters for each frame image;

a program for causing the computer to provide an interface screen for allowing a user to designate a user-selected frame image, which is desired to be used in the digest video data;

a program for causing the computer to establish, based on the frame evaluation levels of the frame images, reference indicator information representing an indicator display format of a reference indicator, which is to be presented on the interface screen to assist the user in specifying the user-selected frame image;

a program for causing the computer to receive designating information input by the user that designates the user-selected frame image; and a program for causing the computer to produce the digest video data including at least a portion of designated frame data which represent a series of frame images including the user-selected frame image, wherein the interface screen includes:

a digest button for specifying one or more positions for designating the use-selected frame image;

an evaluation criterion selection area for enabling selection of an evaluation criterion for use when calculating the frame evaluation level;

a playback display area for playback of video based on the video data;

a playback position indication area for graphically indicating a playback position of the video data with a slide bar; and a reference indicator display area for displaying the reference indicator according to the reference indicator information, the reference indicator including a division indicator indicating separation between different scenes and a most-valuable-frame indicator indicating a frame position having the highest frame evaluation level within each scene, the play back position indication area further displaying on the slide bar a segment of the video portion designated by the digest button by the user wherein the segment is displayed distinct from the other portions of the video.

* * * * *